United States Patent Office

2,861,084
Patented Nov. 18, 1958

2,861,084

PROCESS FOR THE PRODUCTION OF BUTADIENE DIOXIDE

Paul S. Starcher, Donald L. MacPeek, and Benjamin Phillips, Charleston, W. Va., assignors to Union Carbide Corporation, a corporation of New York No Drawing. Application July 6, 1954
Serial No. 441,682

12 Claims.  (Cl. 260—348.5)

This invention relates to a new and novel combination of steps for the synthesis of butadiene dioxide which utilizes readily available starting materials and wherein the steps of the synthesis are conducted with high efficiencies and yields.

Butadiene dioxide is the simplest organic compound having two oxirane oxygen atoms or alpha epoxide rings and may be represented by the general formula:

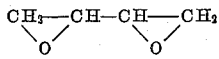

Butadiene dioxide by virtue of its reactivity and bifunctionality is a compound of great commercial importance since the epoxide rings are highly reactive toward both acidic and basic reagents and react readily with most active hydrogen compounds to provide a host of useful chemical compounds.

The steps of the process of this invention may be conveniently illustrated by the sequence of operations set forth as follows:

Chlorination step (1)   $CH_2=CH-CH=CH_2 + Cl_2 \rightarrow$
          $Cl-CH_2-CH=CH-CH_2Cl$ Epoxidation step (2)
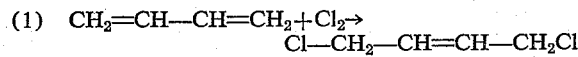

Hydrolysis step (3)
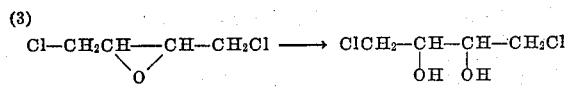

Dehydrochlorination step (4)
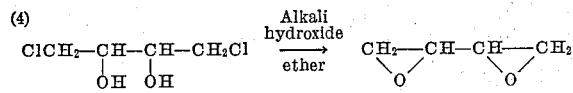

In its broadest aspects, this invention relates to a combination of steps for the production of butadiene dioxide which comprises reacting 1,3-butadiene and chlorine to produce 1,4-dichloro-2-butene, reacting the 1,4-dichloro-2-butene with an epoxidizing agent selected from the group consisting of peracetic acid and acetaldehyde monoperacetate at an elevated temperature in the range of from about 50° C. to 150° C. to produce 1,4-dichloro-2,3-epoxybutane, hydrolyzing the 1,4-dichloro-2,3-epoxybutane to 1,4-dichloro-2,3-butanediol by heating with water, and effecting dehydrochlorination of the 1,4-dichloro-2,3-butanediol by reaction with a finely divided alkali hydroxide in a water-immiscible ether to produce butadiene dioxide and recovering the butadiene dioxide thus formed.

More particularly, the process of this invention relates to a combination of steps for the production of butadiene dioxide which comprises reacting 1,3-butadiene and chlorine to produce 1,4-dichloro-2-butene, reacting the 1,4-dichloro-2-butene with an epoxidizing agent selected from the group consisting of peracetic acid and acetaldehyde monoperacetate at an elevated temperature in the range of from about 50° C. to 150° C. to produce 1,4-dichloro-2,3-epoxybutane, hydrolyzing the 1,4-dichloro-2,3-epoxybutane to 1,4-dichloro-2,3-butanediol by heating, in the presence of an acidic catalyst, with water and a water-miscible organic ether in which the 1,4-dichloro-2,3-epoxybutane is substantially soluble, said ether being employed in an amount sufficient to form a single phase reaction mixture and isolating the 1,4-dichloro-2,3-butanediol; forming a mixture comprising 1,4-dichloro-2,3-butanediol, an anhydrous salt and a water-immiscible organic ether and reacting said mixture with finely divided alkali hydroxide to produce butadiene dioxide and recovering the butadiene dioxide thus formed.

While the invention is directed to a novel combination of steps for the production of butadiene dioxide from butadiene and chlorine, it is also directed to and includes within its scope certain new and novel process steps for the production of the compounds which are intermediates in the over-all process.

One of the more specific aspects of this invention is directed to a process for the production of 1,4-dichloro-2,3-epoxybutane which comprises reacting 1,4-dichloro-2-butene with an oxidizing agent selected from the group consisting of peracetic acid and acetaldehyde monoperacetate at an elevated temperature in the range of from about 50° C. to 150° C. and recovering the resultant product.

Another of the novel features of this invnetion is directed to a process for the production of 1,4-dichloro-2,3-butanediol from 1,4-dichloro-2,3-epoxybutane which comprises hydrolyzing 1,4-dichloro-2,3-epoxybutane, in the presence of an acidic catalyst, with water and a water-miscible organic ether in which the 1,4-dichloro-2,3-epoxybutane is substantially soluble, to form a single phase reaction mixture, to produce 1,4-dichloro-2,3-butanediol and isolating and recovering the same.

The chlorination step of the over-all process of the invention involves the 1,4-addition of chlorine to butadiene to produce 1,4-dichloro-2-butene and may be done by any convenient method disclosed in the literature. The reaction product may be recovered by distillation or used directly in the epoxidation step. In the event that the 1,4-dichloro-2-butene is not distilled prior to the epoxidation step, it is desirable that the crude product be treated, in some manner such as washing with water, to remove hydrogen chloride.

The epoxidation step of the over-all process is conducted by treating 1,4-dichloro-2-butene with peracetic acid or acetaldehyde monoperacetate at a temperature in the range of from 50° C. to 150° C. An excess of either 1,4-dichloro-2-butene or of peracetic acid or acetaldehyde monoperacetate may be used in the epoxidation step although equimolar proportions of reactants can be employed with equal success.

The 1,4-dichloro-2,3-epoxybutane can be isolated from the reaction mixture by any conventional method, such as, fractional distillation; but if desired the residue product can be used directly in the hydrolysis step. It is preferred, however, to distill the 1,4-dichloro-2,3-epoxybutane from the reaction mixture since this permits higher yields and purity of product in the hydrolysis step.

The hydrolysis step of this invention is brought about by heating at an elevated temperature, preferably in the range of 50° C. to 175° C., 1,4-dichloro-2,3-epoxybutane with and excess of water in the presence of an acidic catalyst. It has been discovered that if the hydrolysis is conducted in a mixture comprising water and a water-miscible ether free of functional groups other than the ether linkage, said water soluble ether being employed in an amount sufficient to produce a single phase system, 1,4-dichloro-2,3-butanediol is produced in high yields and high purity.

The ethers employed may be any of the water soluble ethers which are free from functional groups other than the ether linkage and include compounds such as, for example, dioxane, tetrahydrofuran, dimethyl ether, ethylene glycol dimethyl ether, diethyleneglycol diethyl ether, and the like.

The amount of water used during the hydrolysis step should be greatly in excess of the 1,4-dichloro-2,3-epoxy-butane. It is preferred to heat the epoxide with at least 5 to 200 equivalents of water in the presence of from 0.05 to 5% of sulphuric acid catalyst (based on the total weight of the reaction mixture) and an amount of a water-soluble ether sufficient to provide a single phase reaction mixture.

The 1,4-dichloro-2,3-butanediol thus produced can be isolated from the reaction mixture by concentration of the reaction mixture, crystallization of the product and filtering the product from the mother liquor.

The dehydrochlorination step is carried out by forming a mixture comprising the 1,4-dichloro-2,3-butanediol, recovered in the hydrolysis step, a water insoluble ether, and an anhydrous salt and adding to said mixture a finely divided alkali hydroxide, such as potassium or sodium hydroxide, and heating said mixture at a temperature in the range of 0° C. to 60° C. The finely divided alkali hydroxide is added to the mixture with cooling to maintain the temperature in the desired range. After the addition of the alkali hydroxide is complete the mixture is filtered to remove the salts formed during the reaction. The organic phase is then fractionally distilled preferably under reduced pressures, and butadiene dioxide is obtained in high purity as a colorless distillate.

Typical water-insoluble ethers which can be employed successfully in carrying out the dehydrochlorination step include ethers, such as diethyl ether, n-butyl ether, isopropyl ether, n-hexyl ether and the like.

In carrying out the dehydrochlorination step the 1,4-dichloro-2,3-butanediol is dissolved in a water-insoluble ether. The amount of water-insoluble ether employed is an amount of from 100 percent to 400 percent, by weight, based on the 1,4-dichloro-2,3-butanediol. The amount of powdered alkali hydroxide employed can be the amount theoretically required for complete dehydrochlorination, but it is preferred to employ an amount which is from 1.4 to 8.0 equivalents for each mol of 1,4-dichloro-2,3-butanediol.

The use of an anhydrous salt is unique in that the anhydrous salt prevents a gumming-up of the powdered alkali hydroxide due to the formation of water during the reaction. This water slows down the reaction, thus permitting side reactions such as ring opening and polymerization to assume greater importance. Typical anhydrous salts which can be employed successfully in carrying out the process of this invention include the alkali and alkaline earth metal salts such as, for example, sodium sulfate, magnesium sulfate, potassium carbonate, calcium sulfate and the like. The amount of anhydrous salt employed preferably is an amount which is from 30 percent to 100 percent, by weight, based on the amount of alkali hydroxide employed in the reaction.

The following examples will serve to illustrate the practice of the invention:

EXAMPLE I

*Preparation of 1,4-dichlorobutene*

Approximately 981 grams of butadiene and 1647 grams of chlorine were introduced over a period of one hour into a jacketed, vertical, unpacked, tubular steel reactor (3⅝ inches in internal diameter and 39 inches in length). The gaseous butadiene entered the reactor at the top, and gaseous chlorine was introduced through a perforated ring of copper tubing at a point three inches below. The temperature was controlled by circulating tempered water through the reactor jacket. The average temperatures were 90° C. at the top of the tube and 13° C. at the bottom. Approximately 2489 parts of condensate was obtained. Distillation of this condensate gave the fractions shown below:

| No. | B. P., ° C. | Pressure, mm. | Weight, percent | 3,4-dichloro-1-butene, percent | 1,4-dichloro-2-butene |
|---|---|---|---|---|---|
| 1 | 60-64 | 100 | 0.8 | 91.5 | 0.0 |
| 2 | 64-70 | 100 | 24.5 | 99.0 | 0.0 |
| 3 | 45-70 | 40 | 4.9 | 62.0 | 21.0 |
| 4 | 38-45 | 10 | 1.5 | 19.0 | 68.0 |
| 5 | 45-48 | 10 | 5.1 | 6.0 | 96.3 |
| 6 | 48-50 | 10 | 21.2 | 0.0 | 99.3 |
| 7 | 50-52 | 10 | 6.0 | 4.7 | 81.7 |
| 8 | 52-54 | 10 | 2.1 | 12.4 | 51.0 |
| 9 | 54-65 | 10 | 8.0 | 0.0 | 9.0 |
| 10 | Residue | | 22 | | |

The combined yield of dichlorobutenes was 70 percent of the theoretical, the yield of the 3,4-dichloro-1-butene being 32 percent, and the yield of 1,4-dichloro-2-butene being 38 percent.

EXAMPLE II

*Preparation of 1,4-dichloro-2,3-epoxybutane*

A solution of peracetic acid in acetone (708 grams of a 21.5 percent solution) was fed dropwise with stirring to a flask containing 1000 grams of 1,4-dichloro-2-butene at 60° C. After adding approximately one-half of the peracetic acid an analysis indicated that the reaction was proceeding slowly. The temperature was raised to 80° C. to 88° C. and the addition continued. A total of 4 hours was required for the addition to be completed. The reaction was continued for an additional 2 hours at 80° C. to 88° C. After standing overnight at room temperature the reaction mixture was fractionally distilled. The product, 1,4-dichloro-2,3-epoxybutane, a colorless liquid having a boiling point of 66° C. to 68° C. at 5 mm. Hg pressure and a refractive index of 1.4743 ($n_D^{30}$), was obtained in a yield of 82 percent.

EXAMPLE III

*Preparation of 1,4-dichloro-2,3-butanediol*

A mixture of 1500 ml. of water and 1500 ml. of p-dioxane was prepared in a 5-liter flask equipped with a stirrer, dropping funnel, thermometer, and reflux condenser. Then, 61 grams of concentrated sulfuric acid were added with stirring to serve as the catalyst for the reaction. The mixture was heated under reflux and 1,4-dichloro-2,3-epoxybutane was added at such a rate that a single phase was maintained at all times. In all, 1296 grams of the epoxide was added over a five-hour period. The heating was continued for an additional two-hour period after the addition of epoxide was complete. The kettle temperature varied between 89° C. and 92° C. during these operations. A second hydrolysis reaction was conducted using the same quantities and conditions; then the two charges described above were combined and evaporated under reduced pressure to about half of the original volume. The residue was cooled, causing the crystallization of much of the contained 1,4-dichloro-2,3-butanediol. The crude glycol was washed once with diethyl ether and was dried. The ether washings were combined with the mother liquors, and further evaporated to obtain additional crops of product. In all, 2683 grams of 1,4-dichloro-2,3-butanediol was obtained representing a yield of 94 percent. The product con-

EXAMPLE IV

Preparation of butadiene dioxide

One mole of 1,4-dichloro-2,3-butanediol (159 grams) was added to 2300 grams of diethyl ether, and the mixture was stirred at room temperature in a flask fitted with a mechanical stirrer, a thermometer, and a water-cooled condenser. Some of the dichloro-butanediol remained undissolved. To the vigorously agitated mixture was added, over a period of three hours, 2 moles (112 grams) of powdered potassium hydroxide. The reaction which ensued was exothermic, and the temperature rose to the boiling point of diethyl ether (35° C.). After all of the potassium hydroxide had been added, the mixture was heated under reflux for two hours to complete the reaction. The liquid was then decanted from the sodium chloride formed in the reaction and was fractionally distilled in a still having a column (18 in. long and 24 mm. in diameter) packed with glass helices. Butadiene dioxide was obtained in fractions distilling at 64° C. to 65° C. at a pressure of 50 mm. of Hg and having a refractive index of 1.4220 to 1.4279 ($n_D^{30}$). The yield was 0.74 mole; 74 percent of the theoretical. The fraction of highest purity distilled at 65° C. at a pressure of 50 mm. of Hg and had a refractive index of 1.4274. Analysis for oxirane oxygen by the pyridine hydrochloride method showed it to have a purity of 99.5 percent.

EXAMPLE V

Preparation of butadiene dioxide

A five-liter flask was equipped with a powerful, efficient stirrer, reflux condenser, thermometer, and a powder funnel. The apparatus was placed in a hood and suspended in a water-ice bath at 5° C. to 10° C. Sodium sulfate (600 grams) and 1,4-dichloro-2,3-butanediol (954 grams) were placed in the flask and dispersed by stirring in 3000 ml. of diethyl ether. Then, with constant stirring, 960 grams of finely powdered sodium hydroxide was added over a forty minute period. During this period, the temperature in the reaction vessel varied from 25° C. to 30° C. The mixture was stirred for another thirty minutes to complete the reaction. A second run was conducted under the same conditions. The two reaction mixtures were combined and filtered to remove the suspended solids. The spent caustic-salt mixture was washed with ether, and the washings were combined with the above filtrate. Then, the ether was removed by atmospheric distillation. Subsequent vacuum distillation gave 901 grams (87 percent yield) of the desired product, butadiene dioxide, identical in every way to that product prepared by the potassium hydroxide method of Example IV, above; ($n_D^{30}$=1.4272; B. P. =65° C. at 50 mm. Hg).

In the foregoing examples, the analysis for oxirane oxygen is based on its reaction with pyridine hydrochloride to form the chlorhydrin and pyridine. Into a pressure bottle containing 50 milliliters of 0.4 N pyridine hydrochloride was introduced a sample of epoxide calculated to use about 50 percent of the pyridine hydrochloride. The bottle was then closed and the contents heated in a steam bath for a period of two hours. At the end of that time the bottle and contents were cooled, 10 drops of bromocresol purple indicator (0.15 gram per 100 milliliters of methanol) added, and the mixture titrated to a permanent blue endpoint with standard 0.2 N alcoholic potassium hydroxide solution. A blank was also run in precisely the same fashion except that the sample was omitted.

What is claimed is:

1. A process for the production of butadiene dioxide, the combination of steps which comprises (1) reacting butadiene and chlorine to produce 1,4-dichloro-2-butene; (2) reacting the 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C., with water and a water-miscible organic hydrocarbon ether free from functional groups other than ether linkages in which the 1,4-dichloro-2,3-epoxybutane is substantially soluble, said water-miscible ether being employed in an amount sufficient to provide a single phase reaction mixture, to produce 1,4-dichloro-2,3-butanediol and isolating the 1,4-dichloro-2,3-butanediol; (4) forming a mixture comprising 1,4-dichloro-2,3-butanediol, an anhydrous salt selected from the group consisting of alkali and alkaline earth metal sulfates and a water-immiscible dialkyl ether and reacting said mixture with finely divided alkali hydroxide to produce butadiene dioxide and recovering the butadiene dioxide thus formed.

2. A process for the production of butadiene dioxide, the combination of steps which comprises (1) reacting butadiene and chlorine to produce 1,4-dichloro-2-butene; (2) reacting the 1,4-dichloro-2-butene and peracetic acid at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C., with water, in the presence of an acidic catalyst and dioxane, said dioxane being employed in an amount sufficient to provide a single phase reaction mixture, to produce 1,4-dichloro-2,3-butanediol and isolating the 1,4-dichloro-2,3-butanediol; (4) forming a mixture comprising 1,4-dichloro-2,3-dihydroxybutane, anhydrous alkali metal sulfate and diethyl ether and reacting said mixture with finely divided sodium hydroxide to produce butadiene dioxide and recovering the butadiene dioxide thus formed.

3. A process for the production of butadiene dioxide, the combination of steps which comprises (1) reacting butadiene and chlorine to produce 1,4-dichloro-2-butene; (2) reacting the 1,4-dichloro-2-butene and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating, with water, in the presence of an acidic catalyst and dioxane, said dioxane being employed in an amount sufficient to provide a single phase reaction mixture, to produce 1,4-dichloro-2,3-butanediol and isolating the 1,4-dichloro-2,3-butanediol; (4) forming a mixture comprising 1,4-dichloro-2,3-butanediol, anhydrous sodium sulfate and diethyl ether and reacting said mixture with finely divided sodium hydroxide to produce butadiene dioxide and recovering the butadiene dioxide thus formed.

4. A process for the production of butadiene dioxide, the combination of steps which comprises (1) reacting butadiene and chlorine to produce 1,4-dichloro-2-butene; (2) reacting the 1,4-dichloro-2-butene and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating, with water, in the presence of an acidic catalyst and dioxane, said dioxane being employed in an amount sufficient to provide a single phase reaction mixture, to produce 1,4-dichloro-2,3-butanediol, and isolating the 1,4-dichloro-2,3-butanediol; (4) forming a mixture comprising 1,4-dichloro-2,3-butanediol, anhydrous sodium sulfate and diethyl ether and reacting said mixture with finely divided potassium hydroxide to produce butadiene dioxide and recovering the butadiene dioxide thus formed.

5. A process for the production of butadiene dioxide, the combination of steps which comprises (1) reacting butadiene and chlorine to produce 1,4-dichloro-2-butene; (2) reacting the 1,4-dichloro-2-butene and peracetic acid at a temperature in the range of from about 50° C. to 150° C. to produce 1,4-dichloro-2,3-epoxybutane; (3) hydrolyzing the 1,4-dichloro-2,3-epoxybutane by heating, with water, in the presence of an acidic catalyst and dioxane, said dioxane being employed in an amount sufficient to provide a single phase reaction mixture, to produce 1,4-dichloro-2,3-butanediol, and isolating the 1,4-dichloro-2,3-butanediol; (4) forming a mixture comprising 1,4-dichloro-2,3-butanediol, anhydrous sodium sulfate and isopropyl ether and reacting said mixture with finely divided sodium hydroxide to produce butadiene dioxide and recovering the butadiene dioxide thus formed.

6. A process for the production of butadiene dioxide, the combination of steps which comprises (1) reacting butadiene and chlorine to produce 1,4-dichloro-2-butene; (2) reacting the 1,4-dichloro-2-butene and peracetic acid at a temperature in the range of from about 50° C. to 150° C. to produce 1,4-dichloro-2,3-epoxybutane; (3) hydrolyzing the 1,4-dichloro-2,3-epoxybutane by heating, with water, in the presence of an acidic catalyst and dimethyl ether, said dimethyl ether being employed in an amount sufficient to provide a single phase reaction mixture, to produce 1,4-dichloro-2,3-butanediol, and isolating the 1,4-dichloro-2,3-butanediol; (4) forming a mixture comprising 1,4-dichloro-2,3-butanediol, anhydrous sodium sulfate and n-butyl ether and reacting said mixture with finely divided sodium hydroxide to produce butadiene dioxide and recovering the butadiene dioxide thus formed.

7. A process for the production of butadiene dioxide, the combination of steps which comprises (1) reacting butadiene and chlorine to produce 1,4-dichloro-2-butene; (2) reacting the 1,4-dichloro-2-butene and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating, with water, in the presence of an acidic catalyst and tetrahydrofuran, said tetrahydrofuran being employed in an amount sufficient to provide a single phase reaction mixture, to produce 1,4-dichloro-2,3-butanediol, and isolating the 1,4-dichloro-2,3-butanediol; (4) forming a mixture comprising 1,4-dichloro-2,3-butanediol, anhydrous sodium sulfate and n-hexyl ether and reacting said mixture with finely divided potassium hydroxide to produce butadiene dioxide and recovering the butadiene dioxide thus formed.

8. A process for the production of butadiene dioxide, the combination of steps which comprises (1) reacting butadiene and chlorine to produce 1,4-dichloro-2-butene; (2) reacting equimolar amounts of 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C. with water and dioxane, said dioxane being employed in an amount sufficient to provide a single phase reaction mixture to produce 1,4-dichloro-2,3-butanediol, and isolating the 1,4-dichloro-2,3-butanediol; (4) forming a mixture comprising 1,4-dichloro-2,3-butanediol, an anhydrous sodium sulfate and diethyl ether and reacting said mixture at a temperature in the range of from 0° C. to 60° C. with alkali hydroxide to produce butadiene dioxide and recovering the butadiene dioxide thus formed.

9. A process for the production of butadiene dioxide, the combination of steps which comprises (1) reacting butadiene and chlorine to produce 1,4-dichloro-2-butene; (2) reacting equimolar amounts of 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C. with water and dioxane, said dioxane being employed in an amount sufficient to provide a single phase reaction mixture to produce 1,4-dichloro-2,3-butanediol, and isolating the 1,4-dichloro-2,3-butanediol; (4) forming a mixture comprising 1,4-dichloro-2,3-butanediol, an anhydrous sodium sulfate and isopropyl ether and reacting said mixture at a temperature in the range of from 0° C. to 60° C. with alkali hydroxide to produce butadiene dioxide and recovering the butadiene dioxide thus formed.

10. A process for the production of butadiene dioxide, the combination of steps which comprises (1) reacting butadiene and chlorine to produce 1,4-dichloro-2-butene; (2) reacting equimolar amounts of 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C. with water and dioxane, said dioxane being employed in an amount sufficient to provide a single phase reaction mixture to produce 1,4-dichloro-2,3-butanediol, and isolating the 1,4-dichloro-2,3-butanediol; (4) forming a mixture comprising 1,4-dichloro-2,3-butanediol, an anhydrous sodium sulfate and n-butyl ether and reacting said mixture at a temperature in the range of from 0° C. to 60° C. with alkali hydroxide to produce butadiene dioxide and recovering the butadiene dioxide thus formed.

11. A process for the production of butadiene dioxide, the combination of steps which comprises (1) reacting butadiene and chlorine to produce 1,4-dichloro-2-butene; (2) reacting equimolar amounts of 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C. with water and dimethyl ether, said dimethyl ether being employed in an amount sufficient to provide a single phase reaction mixture to produce 1,4-dichloro-2,3-butanediol, and isolating the 1,4-dichloro-2,3-butanediol; (4) forming a mixture comprising 1,4-dichloro-2,3-butanediol, an anhydrous sodium sulfate and n-butyl ether and reacting said mixture at a temperature in the range of from 0° C. to 60° C. with alkali hydroxide to produce butadiene dioxide and recovering the butadiene dioxide thus formed.

12. A process for the production of butadiene dioxide, the combination of steps which comprises (1) reacting butadiene and chlorine to produce 1,4-dichloro-2-butene; (2) reacting equimolar amounts of 1,4-dichloro-2-butene and an epoxidizing agent selected from the group consisting of peracetic acid and acetaldehyde monoperacetate at a temperature in the range of from about 50° C. to 150° C. to produce 1,4-dichloro-2,3-epoxybutane; (3) hydrolyzing the 1,4-dichloro-2,3-epoxybutane by heating at a temperature in the range of from 50° C. to 175° C. with water and tetrahydrofuran, said tetrahydrofuran being employed in an amount sufficient to provide a single phase reaction mixture to produce 1,4-dichloro-2,3-butanediol, and isolating the 1,4-dichloro-2,3-butanediol; (4) forming a mixture comprising 1,4-dichloro-2,3-butanediol, an anhydrous sodium sulfate and n-hexyl ether and reacting said mixture at a temperature in the range of from 0° C. to 60° C. with alkali hydroxide to produce the butadiene dioxide thus formed.

References Cited in the file of this patent

UNITED STATES PATENTS

| | | |
|---|---|---|
| 2,061,377 | Groll | Nov. 10, 1936 |
| 2,070,990 | Groll | Feb. 16, 1937 |

(Other references on following page)

UNITED STATES PATENTS

| | | |
|---|---|---|
| 2,086,077 | Groll | July 6, 1937 |
| 2,116,439 | Levine | May 3, 1938 |
| 2,296,687 | Rosenstein | Sept. 22, 1942 |
| 2,314,039 | Evans | Mar. 16, 1943 |
| 2,321,037 | Marple | June 8, 1943 |
| 2,443,280 | Swern | June 15, 1948 |
| 2,458,484 | Terry | Jan. 4, 1949 |

FOREIGN PATENTS

| | | |
|---|---|---|
| 730,116 | Germany | Mar. 19, 1943 |

OTHER REFERENCES

Prileschajew: Berichte 59B:194–198 (1926).

J. Chem. Soc., 1951, 2483–7.

Fourneau: Bull. Soc. Chim., France 12:845 (1945).

Valette: Ann. de Chimie 3:650, #12, 1948 (complete article 644–678).

Swern: Chem. Reviews, 45:1–68 (1949).